Jan. 1, 1924.

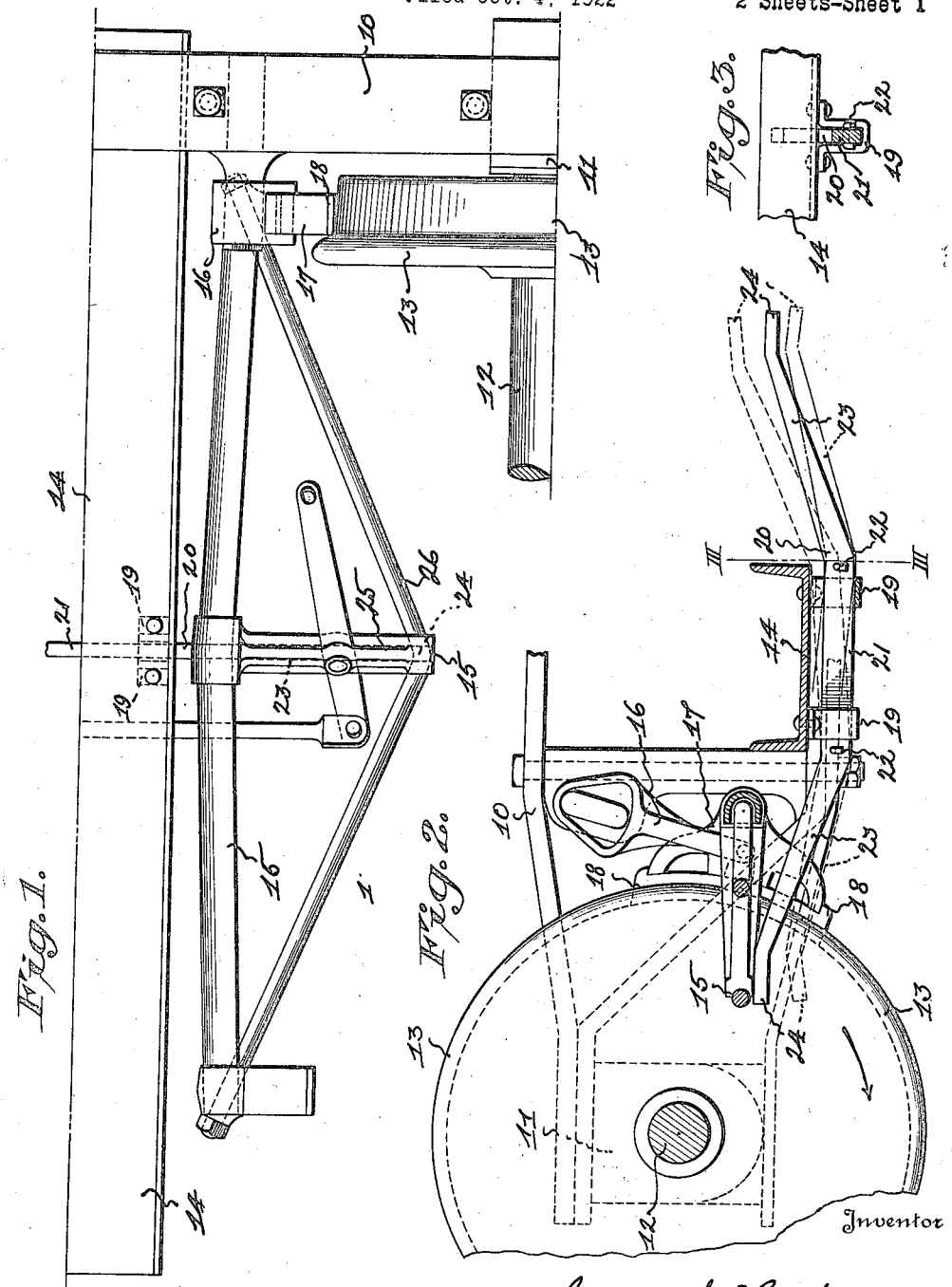

B. HASKELL

BRAKE BEAM SUPPORT

Filed Oct. 4, 1922

WITNESS:—
Chas. L. Griesbauer

Inventor
Broderick Haskell,
By W. Schornborn,
Attorney

Patented Jan. 1, 1924.

1,479,235

UNITED STATES PATENT OFFICE.

BRODERICK HASKELL, OF FRANKLIN, PENNSYLVANIA.

BRAKE-BEAM SUPPORT.

Application filed October 4, 1922. Serial No. 592,292.

*To all whom it may concern:*

Be it known that I, BRODERICK HASKELL, a citizen of the United States, residing at Franklin, in the county of Venango and State of Pennsylvania, have invented certain new and useful Improvements in Brake-Beam Supports, of which the following is a specification.

This invention relates to means for supporting the brake beams of railway trucks, and more particularly to the type of support known as the third and fourth point suspension in which there is employed, in addition to the usual hangers at the opposite ends of the brake beam, one or more supports for a portion of the brake beam, for the purpose of maintaining the brake beam substantially level and parallel in its various positions in either direction of rotation of the wheels and under different conditions of service and wear of the brake shoes and wheels.

The objects of the invention are is follows:

First, to provide a brake beam support of the character above indicated which will be simple in character and consist of a minimum number of parts, readily inspected, easily installed, taken apart or repaired, and which requires no skilled labor or tedious adjustments to be kept in efficient and constant operation.

Second, to provide a single element as a rocking or tilting cantilever arm or support which is automatically operated by the rise of one brake beam and the fall of its mate which action takes place simultaneously when the brakes are applied to the oppositely rotating inner sections of the truck wheels, and such movement of the brake beams is freely permitted by the unchecked elevation at one end and depression of the other end of said rocking or tilting cantilever arm.

Third, other objects and advantages of the invention will appear from the detailed construction and arrangement of the parts, manner of assembling the same and mode of operation to be hereinafter more fully described.

The invention consists of structural characteristics and relative arrangements of elements which will be presently more fully disclosed and particularly pointed out in the appended claims.

In the drawings, in which similar reference characters indicate the same parts in the several figures:

Figure 1 is a fragmentary and plan view of a car truck with the present invention applied.

Figure 2 is a fragmentary and side view of the car truck showing the application of the improved brake beam support.

Figure 3 is a section on line III—III of Figure 2.

Figure 4:
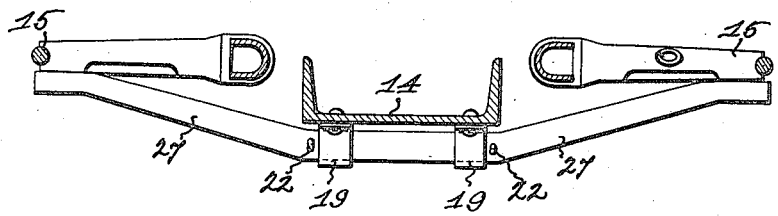
Figure 4 is a side elevation of a portion of a truck showing a modified form of the brake beam support.

Referring to Figures 1, 2 and 3, 10 is the truck frame provided with the usual journal box or bearing 11 at each side supporting the axle 12 carrying the truck wheels 13, as is common in this class of inventions and needs no further disclosure.

At the middle section of the truck frame 10 is the usual spring plank 14 on which are carried the well known springs, not shown, and commonly employed in this class of inventions.

15 is one of the brake beams and is supported by means of the usual brake hangers 16 pivotally connected in any suitable manner at its upper end to the truck frame 10, while its lower end is pivotally attached to the brake head 17 carrying the brake shoe 18, said brake shoe engaging the inner side of the truck wheel 13, or the section of said wheel adjacent to or facing the spring plank 14.

On the lower or underside and at the middle section of the spring plank 14 are provided or attached two separated brackets or bearings 19, 19, preferably arranged in this modification of the invention near the transverse edges of the spring plank, as shown in Figure 2. Loosely supported within said brackets or bearings 19, 19, is provided a rocking, tilting, or oscillating cantilever or counterbalance brake beam support or arm 20 which is proportioned and formed as to have its middle portion 21 loosely and freely sustained within said brackets or bearings 19, 19, and retained therein by means of pins 22, 22, as indicated. The sections 23, 23, of the arm or brake beam support 20 extending beyond the outer edges of the spring plank 14 are preferably bent upwardly and outwardly, so that each of their outer ends 24, 24, engage and form a sliding support for a brake beam 15 preferably in line with the strut member 25 and at the section where said strut member 25 abuts against the tension member 26, as clearly shown in Figure 1.

Normally when the brakes are not being applied the brake beam support 20 assumes the horizontal position shown in full lines in Figure 2, and as will be readily understood its outer ends 24, 24, form sliding and third point supports for said brake beams 15.

Assuming that the brake shoes 18 are applied and the brake wheel 13 is rotating in a clock-wise direction, as indicated by the arrow in Figure 2, the outer end of the brake beam 15 will tend to be drawn and moved in a downward direction and hence react against the outer left end 24 of the brake beam support 20 and cause said support 20 to rock or tilt on the outer edge of the bracket 19 on the left side of the spring plank 14 and take the position shown in dotted lines, while the opposite or right end 24, of the support 20, will move upwardly and assume the position shown in dotted lines, and hence said support 20 will conform and properly adapt itself to the upward movement of the other and oppositely disposed or companion brake beam, not shown, due to the rotation of its braked wheel surface being in an opposite or counter clock-wise direction, as will be readily understood.

If the truck wheels are rotating in the opposite direction from that just described and the brakes are applied, the brake beam support 20 will rock or tilt on the bracket 19 to the right as a fulcrum and assume a position inclined oppositely from that previously described, and as indicated by dotted lines.

Thus from the foregoing description, it will be seen that as the brakes are applied, the brake beam supporting cantilever arm or support 20 will automatically rock, tilt, or oscillate on either one of the bearings or brackets 19, 19, so that either of its bearing or supporting ends 24, 24, will automatically move above or below a horizontal plane depending on which end 24 of said supporting bar 20 a pressure is exerted due to the action of the rotation of the wheels on the brake shoes, and when the brakes are released, said brake beam support 20 immediately and easily assumes its horizontal or normal position, and as will be seen a single arm or brake beam support 20 is capable of properly and readily cooperating with two brake beams, as the weight of one brake beam applied at one end 24 counterbalances the weight of the other brake beam on the other end 24, and said brake beam support 20 acts in the manner of a sensitive cantilever or balance beam and thereby insuring the uniform, easy and constant operation of said brake beam support under all conditions of service.

Figure 5:
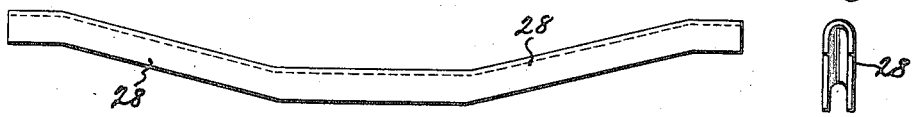
Figures 5 and 6 are respectively side and end views of a further modification of the improved support.
Figure 6:
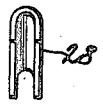

In the form shown in Figure 4, the supporting bar 27, is slightly modified in form from that shown in Figures 1, 2 and 3, while the bar 28 shown in Figures 5 and 6 is U-shaped in cross section to give tightness and at the same time strength for a given weight of material.

Figure 7:
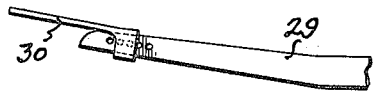
Figure 7 is a fragmentary and side view of one end of the supporting arm provided with an adjustable spring section.

Figure 7 shows the end of the bar 29 provided with an adjustable end 30, which end may be moved back or forth to compensate for wear or distortion of the brake beam supporting bar.

Figure 8:
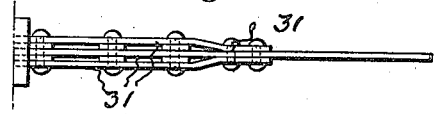
Figures 8 and 9 are respectively plan and side views of one-half of a modified form of the supporting arm built up of several sections.
Figure 9:

Figures 8 and 9 show the supporting bar 31 built up of a number of sections riveted together.

Figure 10:
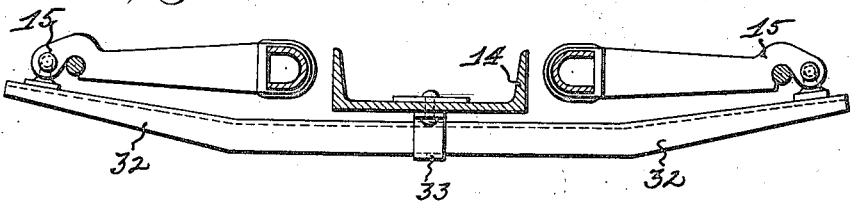
Figure 10 is a side view of a modification showing the brake beam support rocking or tilting on one bracket.

Figure 10 shows a bar 32 of channel-shape in cross section similar to Figure 5, except only one bracket or bearing 33 is provided which is preferably placed in the center of the spring plank 14.

Figure 11:
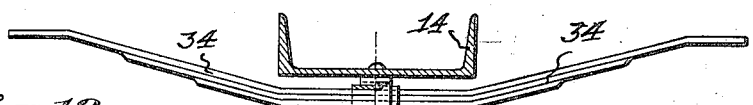
Figure 11 is a side view of a modification similar to Figure 10 with the supporting arm in the form of a leaf spring.

Figure 11 shows a bar 34 made in the form of a laminated spring which is supported from the spring plank 14 by a single and similarly arranged bracket 35 as that shown in Figure 10.

Figure 12:
Figure 12 is a view similar to Figure 11 of a further modification, showing the supporting arm resting on the upper side of the spring plank.

Figure 12 shows a tilting or rocking bar 36 formed so as to have its fulcrum on the top of spring plank 141 and held in position by a combined stop and retainer 37, as shown.

From the foregoing description of the construction and arrangement of the brake beam support, it will be seen that all the advantages and objects of the invention have been fully and efficiently carried out, and while I have shown and described the preferred forms of my invention, it will be manifest that many changes will readily suggest themselves without in any way departing from the spirit of the invention or scope of the claims, as for example, the brake beam supporting bar or cantilever could engage or support the brake beam at two or more properly distributed points instead of one, as shown, without in any way changing the function or broad conception in providing a single supporting arm acting on the cantilever principle.

What I claim is:—

1. The combination of a spring plank, a brake beam supporting and counterbalance bar having its end extending on each side of said spring plank and oscillating on said spring plank as a fulcrum.

2. The combination of a spring plank, a brake beam supporting and counterbalance bar extending on each side of said spring plank and rocking or tilting on said spring plank as a fulcrum.

3. In a brake mechanism, the combination of a car truck having a spring plank and supporting wheels, brake beams pivotally supported on said truck and provided with brake shoes adapted to engage the oppositely disposed surfaces of said wheels facing said spring plank, and a combined counterbalance and supporting arm having its free ends extending beyond said spring plank and engage said brake beams to form a support and so constructed and arranged to be adapted to oscillate on said spring plank as a fulcrum.

4. In a brake beam mechanism, the combination of a car truck having a spring plank and rotatable supporting wheels, a brake beam on each side of said spring plank and pivotally supported on said truck and provided with brake shoes, said brake beams adapted to engage the oppositely rotating surfaces of said wheels adjacent to said spring plank, an arm having its free ends forming a support for said brake beams and so constructed and arranged to be adapted to rock on said spring plank as a fulcrum.

5. The combination of a spring plank, a third point brake beam supporting and counterbalance bar having its end extending on each side of said spring plank and oscillating on said spring plank as a fulcrum.

6. The combination of a spring plank, a third point brake beam supporting and counterbalance bar extending on each side of said spring plank and rocking or tilting on said spring plank as a fulcrum.

7. In a brake mechanism, the combination of a car truck having a spring plank and supporting wheels, brake beams pivotally supported on said truck and provided with brake shoes adapted to engage the oppositely disposed surfaces of said wheels facing said spring plank, and a combined counterbalance and supporting arm having its free ends extending beyond said spring plank and engage said brake beams to form a third point support and so constructed and arranged to be adapted to oscillate on said spring plank as a fulcrum.

8. In a brake mechanism, the combination of a car truck having a spring plank and rotatable supporting wheels, a brake beam on each side of said spring plank and pivotally supported on said truck and provided with brake shoes, said brake beams adapted to engage the oppositely rotating surfaces of said wheels adjacent to said spring plank, an arm having its free ends forming a third point support for said brake beams and so constructed and arranged to be adapted to rock on said spring plank as a fulcrum.

9. In a brake mechanism, the combination of a car truck having a spring plank, a brake beam pivotally supported on said truck and each side of said spring plank, and a combined supporting and counterbalance arm having its free ends extending beyond said spring plank and adapted to engage said brake beams and so constructed and arranged to be adapted to oscillate on said spring plank as a fulcrum.

10. In a brake mechanism, the combination of a car truck having a spring plank, brake beams pivotally supported on said truck, and a third point brake beam supporting and counterbalance arm having its free ends adapted to engage said brake beams and so constructed and arranged to be adapted to rock on said spring plank as a fulcrum.

11. In a brake mechanism, the combination of a car truck having a spring plank, brake beams pivotally supported on said truck, and a combined counterbalance and cantilever arm having its free ends supporting said brake beams and so constructed and arranged to be adapted to oscillate on said spring plank as a fulcrum.

12. The combination of a spring plank, a brake beam on each side of said spring plank, a brake beam supporting bar oscillating on said spring plank as a fulcrum and having an end extending on each side of said spring plank and supporting on each end a brake beam and constructed, arranged and adapted to counterbalance said brake beams one by the other.

In testimony whereof, I affix my signature.

BRODERICK HASKELL.